United States Patent
Beers et al.

(10) Patent No.: US 9,874,239 B2
(45) Date of Patent: Jan. 23, 2018

(54) TURBINE THRUST SHAFT FOR AIR BEARING COOLING

(71) Applicant: Hamilton Sundstrand Corporation, Windsor Locks, CT (US)

(72) Inventors: Craig M. Beers, Wethersfield, CT (US); Christopher McAuliffe, Windsor, CT (US); John H. Paliulis, South Windsor, CT (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 273 days.

(21) Appl. No.: 14/883,120

(22) Filed: Oct. 14, 2015

(65) Prior Publication Data

US 2017/0108031 A1    Apr. 20, 2017

(51) Int. Cl.

| F16C 17/02 | (2006.01) |
|---|---|
| F16C 3/02 | (2006.01) |
| B64D 13/02 | (2006.01) |
| B64D 13/08 | (2006.01) |
| F16C 37/00 | (2006.01) |
| B64D 13/06 | (2006.01) |

(52) U.S. Cl.
CPC ............... *F16C 3/02* (2013.01); *B64D 13/02* (2013.01); *B64D 13/08* (2013.01); *F16C 17/024* (2013.01); *F16C 37/002* (2013.01); *B64D 2013/0614* (2013.01); *F16C 2240/54* (2013.01)

(58) Field of Classification Search
CPC ...... F16C 3/02; F16C 17/024; F04D 13/0646; F04D 17/08; F04D 13/12; F04D 17/122; B64D 13/08
USPC .......................................... 415/104
See application file for complete search history.

(56) References Cited

U.S. PATENT DOCUMENTS

| 8,070,873 B2* | 12/2011 | Lee ........................... C23C 4/02 |
| | | 106/287.18 |
| 8,517,665 B2* | 8/2013 | Lugo ..................... F01D 25/168 |
| | | 415/107 |
| 8,622,620 B2* | 1/2014 | Beers .................... F04D 25/082 |
| | | 384/115 |
| 8,734,017 B1* | 5/2014 | Colson .................. F01D 25/186 |
| | | 384/107 |

* cited by examiner

*Primary Examiner* — Nathaniel Wiehe
*Assistant Examiner* — Joe Gonzalez, Jr.
(74) *Attorney, Agent, or Firm* — Cantor Colburn LLP

(57) ABSTRACT

A turbine thrust shaft providing a thrust disk having a surface P and a surface Q, and a shaft body formed through the thrust disk, the shaft body including a first plurality of holes, wherein the first plurality of holes are spaced apart and each hole of the first plurality of holes has a first diameter between 0.0600 inches to 0.0680 inches and has a first center disposed a first distance between 0.1400 inches to 0.1600 inches from surface P, and a second plurality of holes wherein the second plurality of holes are spaced apart and each hole of the second plurality of holes has a second diameter between 0.0960 inches to 0.1040 inches and has a second center disposed a second distance between 2.1350 inches to 2.1550 inches from surface Q.

16 Claims, 2 Drawing Sheets

TURBINE THRUST SHAFT FOR AIR BEARING COOLING

BACKGROUND

The subject matter disclosed herein relates to turbine thrust shafts and more particularly, to a turbine thrust shaft for providing journal bearing cooling within an air cycle machine for an aircraft.

Typically, during operation of an air cycle machine the rotating components, such as a turbine thrust shaft, may be supported by a journal bearing. Certain operating conditions may create high journal bearing load conditions, creating excessive journal bearing heat. The use of a turbine thrust shaft to facilitate increased cooling flow to the journal bearing is desired.

BRIEF SUMMARY

According to an embodiment, a turbine thrust shaft includes a thrust disk having a surface P and a surface Q, and a shaft body formed through the thrust disk, the shaft body including a first plurality of holes, wherein the first plurality of holes are spaced apart and each hole of the first plurality of holes has a first diameter between 0.0600 inches to 0.0680 inches and has a first center disposed a first distance between 0.1400 inches to 0.1600 inches from surface P, and a second plurality of holes wherein the second plurality of holes are spaced apart and each hole of the second plurality of holes has a second diameter between 0.0960 inches to 0.1040 inches and has a second center disposed a second distance between 2.1350 inches to 2.1550 inches from surface Q.

According to an embodiment, an air cycle machine, includes a journal bearing, a turbine thrust shaft, including, a thrust disk having a surface P and a surface Q, and a shaft body formed through the thrust disk, the shaft body including, a first plurality of holes, wherein the first plurality of holes are spaced apart and each hole of the first plurality of holes has a first diameter between 0.0600 inches to 0.0680 inches and has a first center disposed a first distance between 0.1400 inches to 0.1600 inches from surface P, and a second plurality of holes wherein the second plurality of holes are spaced apart and each hole of the second plurality of holes has a second diameter between 0.0960 inches to 0.1040 inches and has a second center disposed a second distance between 2.1350 inches to 2.1550 inches from surface Q.

Technical function of the embodiments described above includes that the first plurality of holes are spaced apart and each hole of the first plurality of holes has a first diameter between 0.0600 inches to 0.0680 inches and has a first center disposed a first distance between 0.1400 inches to 0.1600 inches from surface P, and that the second plurality of holes are spaced apart and each hole of the second plurality of holes has a second diameter between 0.0960 inches to 0.1040 inches and has a second center disposed a second distance between 2.1350 inches to 2.1550 inches from surface Q.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
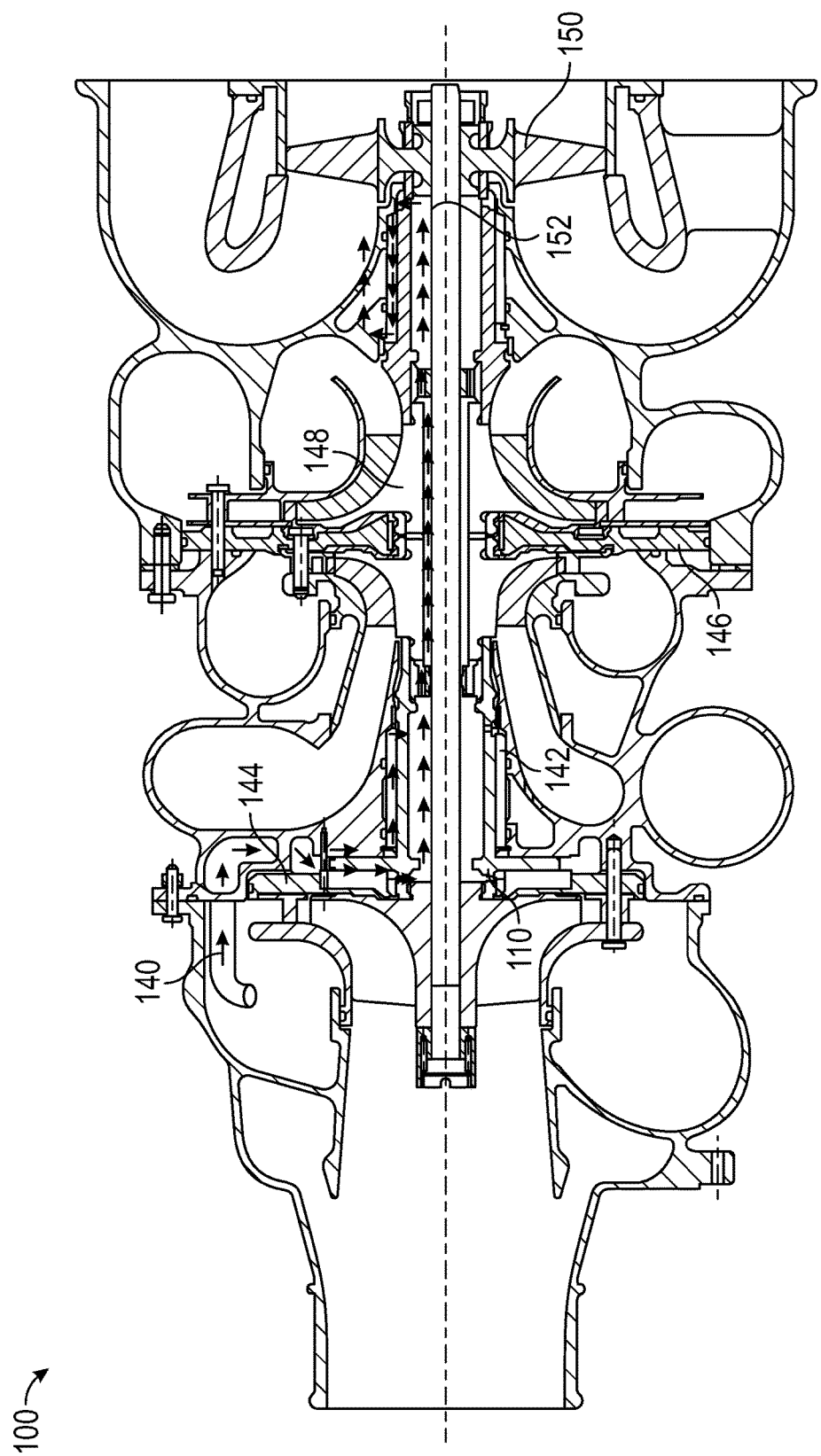
FIG. 1 is a cross sectional view of one embodiment of an air cycle machine.

Referring now to the drawings, FIG. 1 shows an air cycle machine 100. In the illustrated embodiment, the air cycle machine 100 can provide climate and pressure control for an aircraft for cabin ventilation or for cooling electronic components, etc. In the illustrated embodiment, the air cycle machine 100 includes a first turbine (T1) 146, a second turbine (T2) 144, a compressor 148, a fan 150, a turbine thrust shaft 110, an inner shaft 152, and a journal bearing 142. In the illustrated embodiment, the T1 turbine 146, the T2 turbine 144, the compressor 148, and the fan 150 are disposed at axially spaced intervals along common shafts 110, 152, etc. The T1 turbine 146 and the T2 turbine 144 can receive compressed air from a compressed air source such as a turbine engine bleed, an APU bleed, or an electrically powered compressor. In the illustrated embodiment, the T1 turbine 146 and the T2 turbine 144 rotate the common shafts to drive the compressor 148 and the fan 150.

In the illustrated embodiment, the journal bearing 142 provides support to rotatable components, such as the turbine thrust shaft 110. The journal bearing 142 can be a hydrodynamic fluid film journal bearing, also called a journal air bearing or a foil bearing. During operation, rotation of the rotatable component, such as the turbine thrust shaft 110, causes a working fluid to form a cushion (often referred to as an "air bearing") that supports the rotatable component with little or no direct contact between the rotatable component and the foils of the bearing. Journal bearings provide fluid cushions for radial loads.

During operation, the turbine thrust shaft 110 may be rotated at speeds that result in heat generation within the journal bearing 142. The heat can lead to failure of the bearings by compromising the structural integrity of the components of the bearings. In the illustrated embodiment, the features and geometry of the turbine thrust shaft 110 can utilize cooling air flow 140 to remove heat from the journal bearing 142 to reduce the risk of failure of the journal bearing 142, particularly during high load conditions. In certain embodiments, the cooling air flow 140 is supplied from a single high pressure, cool temperature source such as the turbine inlet of the air conditioning system.

Figure 2:
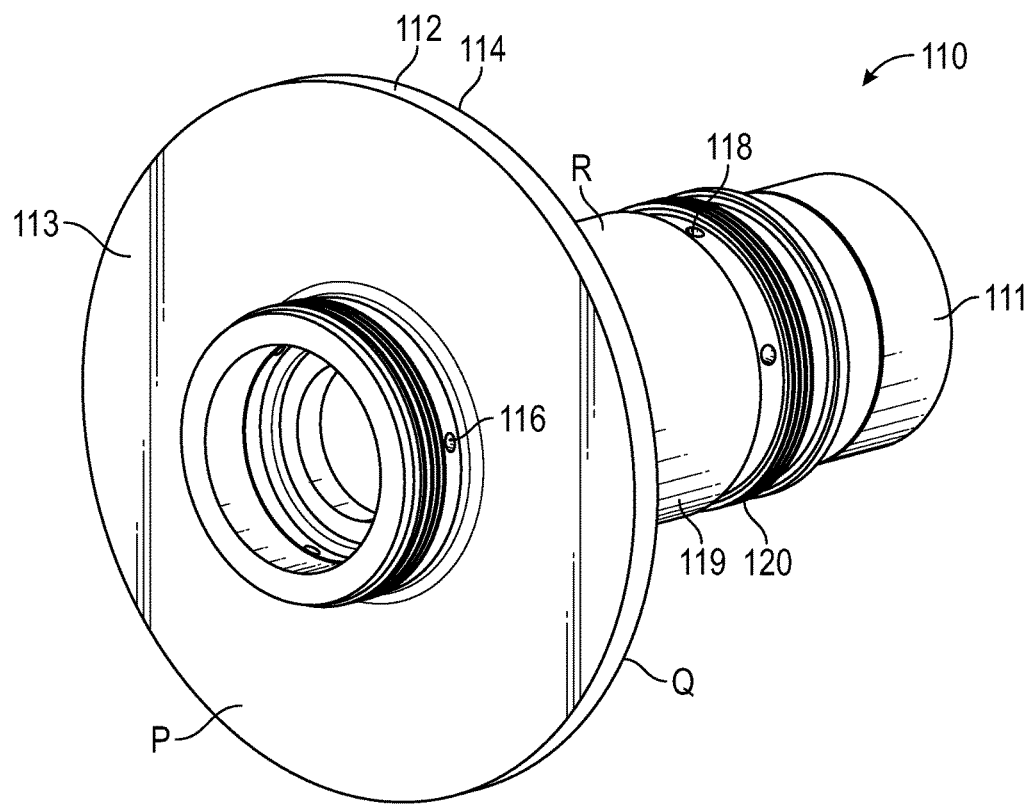
FIG. 2 is an isometric view of one embodiment of a turbine thrust shaft for use with an air cycle machine.
Figure 3:
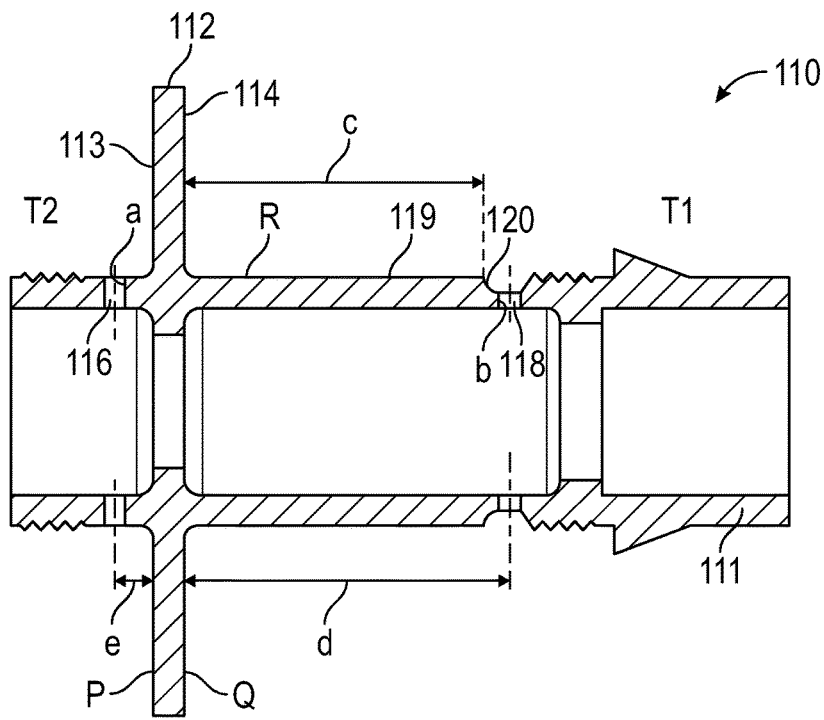
FIG. 3 is a cross sectional view of the turbine thrust shaft of FIG. 2.

Referring to FIGS. 2 and 3, a turbine thrust shaft 110 is shown. In the illustrated embodiment, the turbine thrust shaft includes a shaft body 111, a thrust disk 112, first turbine (T1) side cooling holes 118, second turbine (T2) side cooling holes 116, and a journal bearing surface 119. The turbine thrust shaft 110 can be used with a foil type journal bearing 142. Advantageously, the use of the turbine thrust shaft 110 with air cycle machine 100 allows for additional cooling of a journal bearing 142 by optimizing existing air flow 140 to maximize reliability without sacrificing energy consumption.

In the illustrated embodiment, the shaft body 111 is a hollow shaft that is formed of any suitable material. The shaft body 111 has a T1 end and a T2 identified in FIG. 3. In the illustrated embodiment, the journal bearing surface 119 with a surface R is formed on the shaft body 111.

In the illustrated embodiment, the thrust disk 112 is integrally formed with the shaft body 111. In certain embodiments, the thrust disk 112 can be formed separately and joined to the shaft body 111. In the illustrated embodiment, the thrust disk 112 includes a T1 face 114 with a surface Q and a T2 face 113 with a surface P.

In the illustrated embodiment, the cooling holes 116 and 118 direct and optimize the air flow 140 (FIG. 1) for efficient cooling of the journal bearing 142. In the illustrated embodiment, the T1 cooling holes 118 are disposed toward the T1 side of the shaft body 111. In the illustrated embodiment, T1 cooling holes 118 are 12 holes spaced apart equidistant from each other. The diameter b of the T1 cooling holes 118 can range from 0.0960 inches to 0.1040 inches or 0.100 inches +/−0.004 inches. The T1 cooling holes 118 can be disposed such that the center of each T1 cooling hole 118 is disposed a distance d from surface Q of the T1 face 114, wherein the distance d can range from 2.1350 inches to 2.1550 inches or 2.145 inches +/−0.010 inches.

In the illustrated embodiment, the T2 cooling holes 116 are disposed toward the T2 side of the shaft body 111. In the illustrated embodiment, T2 cooling holes 116 are 3 holes spaced apart equidistant from each other. The diameter a of the T2 cooling holes 116 can range from 0.0600 inches to 0.0680 inches or 0.064 inches +/−0.004 inches. The T2 cooling holes 116 can be disposed such that the center of each T2 cooling hole 116 is disposed a distance e from surface P of the T2 face 113, wherein the distance e can range from 0.1400 inches to 0.1600 inches or 0.150 inches +/−0.010 inches.

Advantageously, the use of T1 cooling holes 118 and T2 cooling holes 116 along with the quantity, size, and relative location of the cooling holes 116, 118 allows for desired airflow to allow for optimized cooling of the journal bearing 142 during operation, allowing for higher loading of the journal bearing 142.

In the illustrated embodiment, the shaft body 111 includes a journal bearing surface 119, also identified as surface R. The journal bearing surface 119 may interface with a foil journal bearing 142. The journal bearing surface 119 extends from the T1 face 114 along the shaft body 111 to the journal bearing surface edge 120. In the illustrated embodiment, the length of this surface R is distance c, 2.060 inches +/−0.010 inches, or ranging from 2.1350 inches to 2.1550 inches. In the illustrated embodiment, the journal bearing surface 119 can have a surface smoothness of 4 Ra or smoother to allow for desired or optimized performance of the journal bearing 142.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A turbine thrust shaft, comprising:
    a thrust disk having a surface P and a surface Q; and
    a shaft body formed through the thrust disk, the shaft body including:
        a first plurality of holes, wherein the first plurality of holes are spaced apart and each hole of the first plurality of holes has a first diameter between 0.0600 inches to 0.0680 inches and has a first center disposed a first distance between 0.1400 inches to 0.1600 inches from surface P; and
        a second plurality of holes wherein the second plurality of holes are spaced apart and each hole of the second plurality of holes has a second diameter between 0.0960 inches to 0.1040 inches and has a second center disposed a second distance between 2.1350 inches to 2.1550 inches from surface Q.

2. The turbine thrust shaft of claim 1, wherein the first plurality of holes is three holes.

3. The turbine thrust shaft of claim 1, wherein the second plurality of holes is twelve holes.

4. The turbine thrust shaft of claim 1, wherein the surface Q is a first face of the thrust disk.

5. The turbine thrust shaft of claim 1, wherein the surface P is a second face of the thrust disk.

6. The turbine thrust shaft of claim 1, wherein the shaft body has a surface R with a surface length between 2.0500 inches to 2.1550 inches.

7. The turbine thrust shaft of claim 6, wherein the surface R is a journal bearing surface.

8. The turbine thrust shaft of claim 7, wherein the journal bearing surface has a surface roughness no greater than 4 Ra.

9. An air cycle machine, comprising:
    a turbine thrust shaft, including:
        a journal bearing;
        a thrust disk having a surface P and a surface Q; and
        a shaft body formed through the thrust disk, the shaft body including:
            a first plurality of holes, wherein the first plurality of holes are spaced apart and each hole of the first plurality of holes has a first diameter between 0.0600 inches to 0.0680 inches and has a first center disposed a first distance between 0.1400 inches to 0.1600 inches from surface P; and
            a second plurality of holes wherein the second plurality of holes are spaced apart and each hole of the second plurality of holes has a second diameter between 0.0960 inches to 0.1040 inches and has a second center disposed a second distance between 2.1350 inches to 2.1550 inches from surface Q.

10. The air cycle machine of claim 9, wherein the first plurality of holes is three holes.

11. The air cycle machine of claim 9, wherein the second plurality of holes is twelve holes.

12. The air cycle machine of claim 9, wherein the surface Q is a first face of the thrust disk.

13. The air cycle machine of claim 9, wherein the surface P is a second face of the thrust disk.

14. The air cycle machine of claim 9, wherein the shaft body has a surface R with a surface length between 2.0500 inches to 2.1550 inches.

15. The air cycle machine of claim 14, wherein the surface R is a journal bearing surface associated with the journal bearing.

16. The air cycle machine of claim 15, wherein the journal bearing surface has a surface roughness no greater than 4 Ra.

* * * * *